Feb. 10, 1959

M. TRESHOW 2,873,242

NEUTRONIC REACTOR SYSTEM

Filed June 29, 1956

INVENTOR.
Michael Treshow
BY
Roland G. Anderson
Attorney

Feb. 10, 1959　　　M. TRESHOW　　　2,873,242
NEUTRONIC REACTOR SYSTEM
Filed June 29, 1956　　　　　　　　　　　6 Sheets-Sheet 2

INVENTOR.
Michael Treshow
BY
Roland A. Anderson
Attorney

Feb. 10, 1959  M. TRESHOW  2,873,242
NEUTRONIC REACTOR SYSTEM
Filed June 29, 1956  6 Sheets—Sheet 3
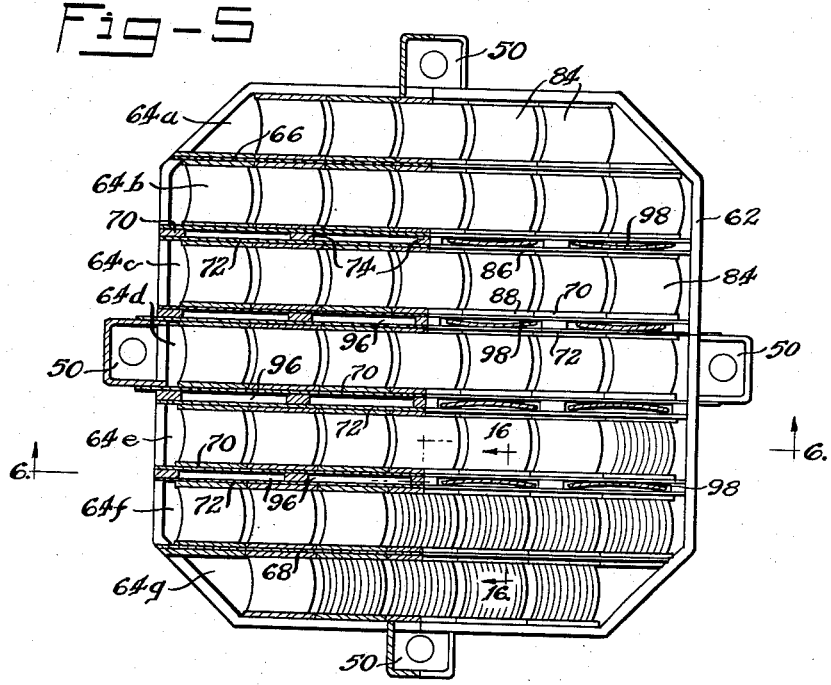
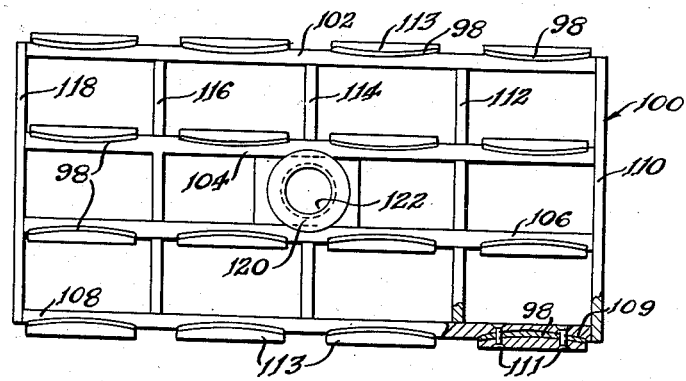
INVENTOR.
Michael Treshow
BY
Roland A. Anderson
Attorney Feb. 10, 1959     M. TRESHOW     2,873,242
NEUTRONIC REACTOR SYSTEM
Filed June 29, 1956     6 Sheets-Sheet 4
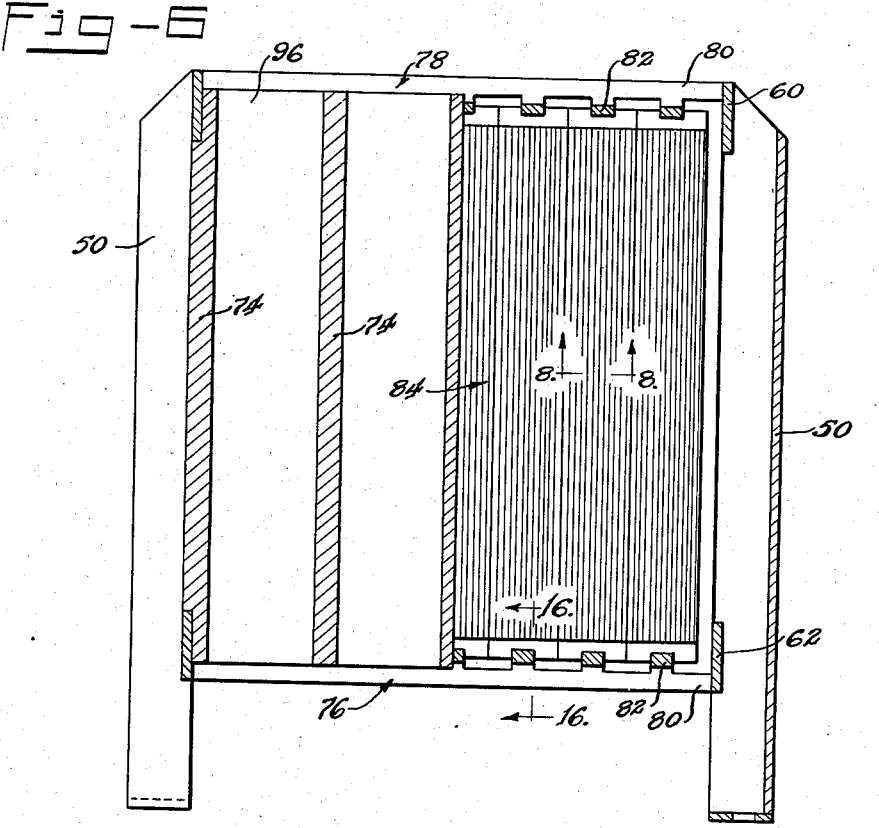
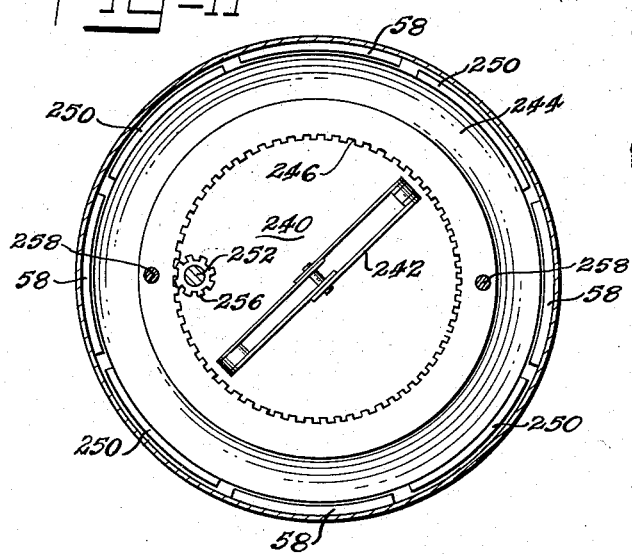
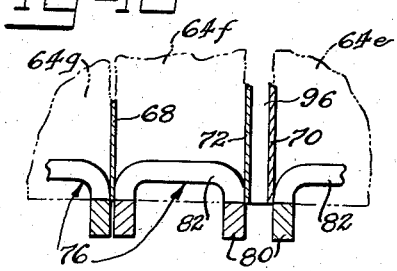
INVENTOR.
Michael Treshow
BY
Roland A. Anderson
Attorney Feb. 10, 1959  M. TRESHOW  2,873,242
NEUTRONIC REACTOR SYSTEM
Filed June 29, 1956
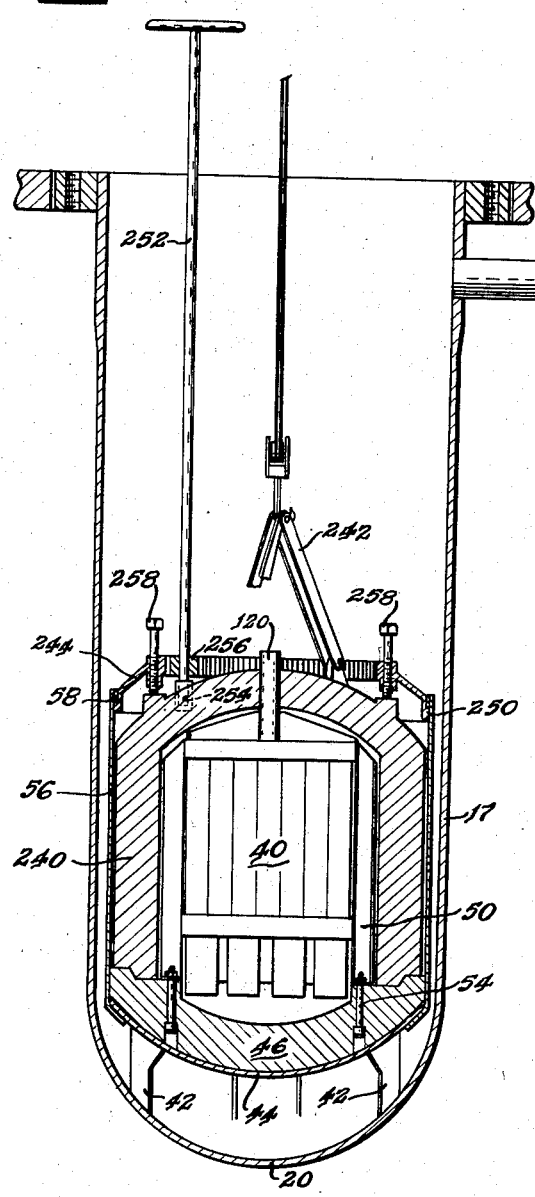
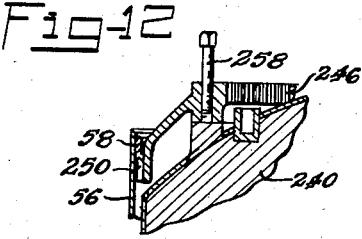
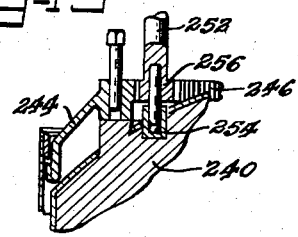
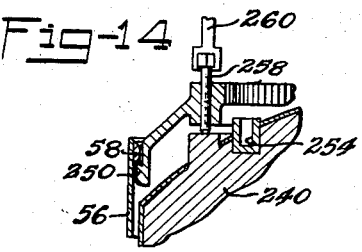
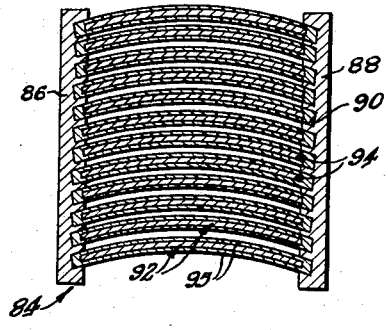
INVENTOR.
Michael Treshow
BY
Roland A. Anderson
Attorney United States Patent Office 2,873,242
Patented Feb. 10, 1959

2,873,242

NEUTRONIC REACTOR SYSTEM

Michael Treshow, Hinsdale, Ill., assignor to the United States of America as represented by the United States Atomic Energy Commission Application June 29, 1956, Serial No. 595,031

7 Claims. (Cl. 204—193.2)

The present invention relates to neutronic reactors and to nuclear power plants.

Neutronic reactors are capable of long-term operation without refueling, and for this reason, neutronic reactors are a very desirable source of power for remote locations. Generally speaking, remote power stations must be capable of unmanned operation for relatively long periods of time. It is one of the purposes of the present invention to provide a neutronic reactor which is capable of unmanned operation over relatively long periods of time.

Control of the neutronic chain reaction is the most serious problem in the design of an unmanned reactor. Stable operation over relatively short periods of time is readily obtained in reactors with relatively large negative temperature coefficients of reactivity, however, relatively long-term changes in reactivity must also be controlled to maintain a relatively constant power level. Boiling reactors are particularly adapted for stable short term operation, as indicated in the patent application of Samuel Untermyer entitled "Device and Method for the Producing Power," filed June 28, 1955, Serial No. 518,427.

The two most important factors which affect long-term reactor stability are changes in the electrical load on the reactor system, and the change in the reactivity of the reactor resulting from burnup of fissionable isotopes during the period of operation. Electrical load changes cannot, in general, be eliminated, and it is difficult to fully compensate for changes in the reactivity of the reactor due to fuel burnup. If "burnable poison" is incorporated in the reactor structure, the effect of fuel element burnup on reactivity will be minimized, but there will, in general, still be changes in reactivity caused by a slightly different rate of conversion of the burnable poison from that of fission of the fuel material. If these two factors are permitted to go unchecked over a relatively long period of time, great changes in the steam production from the reactor could result. It is therefore a further object of the present invention to provide a neutronic reactor which is self-regulating over both the short period and long period of time.

It is a further object of the present invention to provide automatic means exterior to the reactor to control the reactivity of the reactor over relatively long periods of time without relying upon movement of control rods or of other moving parts within the reactor structure.

The inventor has found that the power level of a boiling reactor may be correlated to the demands of a load by providing means to regulate the temperature of the feedwater entering the fuel elements of the reactor. The temperature of the feedwater must be monotonically and inversely related to the power demand of the load in order to regulate the power of the reactor.

Additional objects of the present invention will become readily apparent from a further reading of this disclosure, particularly when viewed in the light of the drawings, in which:

Figure 5 is a sectional view of the reactor core taken along the line 5—5 of Figure 1, the locking mechanism for the fuel elements being removed;

Figure 6 is a sectional view of the reactor core taken along the line 6—6 of Figure 5;

Figure 8 is a sectional view taken along the line 8—8 of Figure 6 illustrating one of the fuel elements of the reactor;

Figure 9 is a plan view of the control mechanism for the reactor shown in Figure 4;

Figure 11 is a plan view of the reactor with the cover removed and the pick-up mechanism for removing the reactor core inserted in the pressure vessel;

Figures 12, 13 and 14 are fragmentary sectional views illustrating three steps in securing the pick-up mechanism to the reactor core;

Figure 15 is a sectional view of the reactor showing the core pick-up mechanism in the process of being secured to the reactor core; and Figure 16 is a sectional view taken along the line 16—16 of Figure 6.

Figure 1:
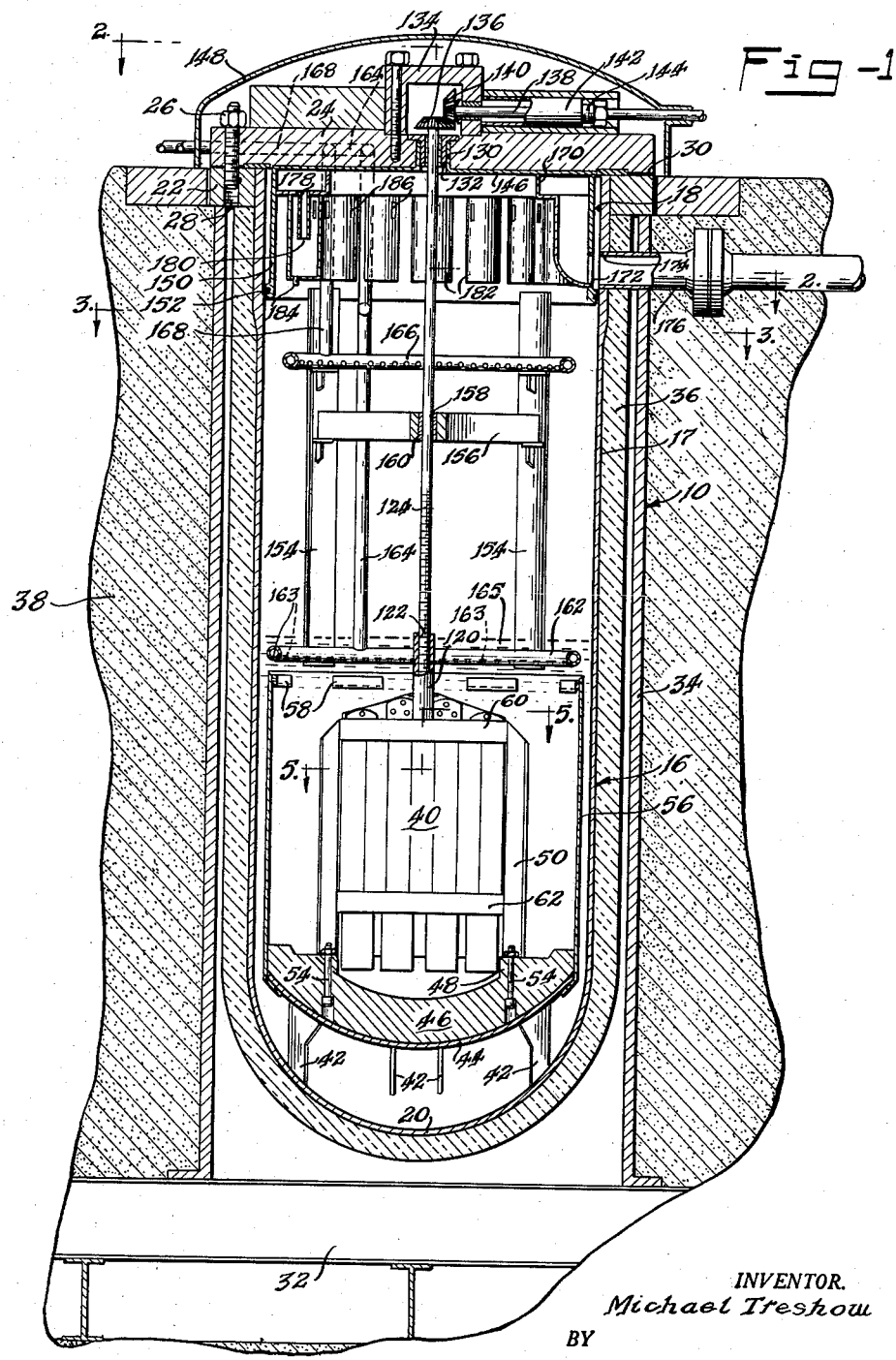
Figure 1 is a vertical sectional view of a reactor incorporating the present invention.

A nuclear power plant constructed according to the teachings of the present invention includes a neutronic reactor 10, a steam and feedwater circuit 12 and a coolant circuit 14, as well as a number of auxiliary apparatuses which will be described hereinafter.

The neutronic reactor 10 is disposed within a pressure vessel 16 which has cylindrical walls 17, an open end 18, and a closed hemispherical end 20. The open end 18 of the reactor pressure vessel 16 has an outwardly extending flange 22 secured thereto, and a cover plate 24 is sealed to the open end 18 of the pressure vessel by a plurality of bolts 26 which extend through the cover plate 24 into threaded apertures 28 in the flange. A gasket 30 is disposed between the cover plate 24 and the open end 18 of the pressure vessel 16.

The pressure vesssel 16 is supported by a framework of I-beams 32 and a cylinder 34 is mounted to the I-beams and extends about the pressure vessel 16 to abut the flange 22 of the pressure vessel. In this manner, the entire pressure vessel is suspended within the cylinder 34. A layer of thermal insulation 36, such as magnesia or fiberglass, is disposed about the exterior surface of the pressure vessel 16. In one particular construction of the invention, which will be described in detail herein, the pressure vessel 16 is constructed of type 304 stainless steel three-fourths inch thick, and is designed to withstand a pressure of four hundred pounds per square inch. The pressure vessel 16 is eleven and one-half feet high with an inside diameter of four feet. The flange 22 is five and one-half inches thick and the layer 36 of insulation is magnesia three inches thick.

The cylinder 34 is constructed of steel, and supports the pressure vessel 16 from the top thereof to permit free expansion and contraction of the pressure vessel. In addition, the cylinder 34 forms a portion of the shielding for the reactor and also a barrier for a layer of soil 38 which surrounds the cylinder 34 and forms part of the radiation shield of the reactor.

The core 40 of the reactor 10 rests upon four brackets 42 secured to the hemispherical closed end 20 of the pressure vessel 16. The four brackets 42 form a cradle for a hemispherically-shaped plate 44 which supports a shield 46 in the form of a lead plate. The shield 46 is also generally hemispherical in shape and has four protruding spaced shoulders 48. The reactor core 40 is mounted to the shoulders 48 by legs 50 of a core support structure 52, the legs 50 being secured to the shield 46 by bolts 54. A cylindrical shroud 56 is secured to the plate 44 and extends upwardly therefrom about the core 40, the shroud 56 being coaxially mounted within the pressure vessel 16. The shroud 56 is provided with a plurality of spaced hooks 58 on its inner surface adjacent to the upper extremity thereof for purposes of removing the core 40, shield 46, and hemispherical plate 44 when it is desired to refuel the reactor, as will be later described.

The four legs 50 are of generally U-shaped construction and extend to the top of the core 40. An upper support box 60 and a lower support box 62 are secured to the four legs 50 parallel to each other. The boxes 60 and 62 are generally square except for flattened corners and are constructed in the form of relatively narrow strips. As indicated in Figure 5, the volume within the two boxes 60 and 62 is divided into seven channels 64a, 64b, 64c, 64d, 64e, 64f, and 64g which are parallel and of equal width. The first two channels on each side of the reactor core 40, designated 64a, 64b, 64f, and 64g are formed by thin walls 66 and 68, respectively, while the channels 64c, 64d, and 64e are formed by double walls 70 and 72. Each of the double walls 70 and 72 are maintained in parallel spaced-apart relationship by five spacers 74 which extend vertically at equal intervals between the walls 70 and 72. Lower support members 76 and upper support members 78 extend between double walls and between the single walls 68 and the adjacent double walls as seen in Fig. 6. The support members 76 and 78 have parallel edge portions 80 and bars 82 extending between the edge portions at spaced intervals, the bars 82 of the lower support members 76 being disposed above the edge portions 80, and the bars 82 of the upper support members 78 being disposed below the edge portions, so that the bars 82 abut both ends of fuel elements 84 which are disposed vertically within the channels 64a, 64b, 64c, 64d, 64e, 64f, and 64g. The end channels 64a and 64g contain five fuel elements 84, where the other channels 64b, 64c, 64d, 64e and 64f each contain seven fuel elements 84.

Each of the fuel elements 84 has a pair of parallel end plates 86 and 88 provided with confronting slots 90 as shown in Fig. 8. There are twelve pairs of confronting slots 90, and twelve fuel plates 92 extend between the pairs of slots. Each of the fuel plates contains a core 94 consisting of thermal neutron fissionable material in the form of uranium containing 93.5% of the isotope $U^{235}$. The core 94 of the fuel elements is sealed within a cladding 95. Each of the forty-five fuel elements 84 in the reactor core 40 contains 191 grams of $U^{235}$ in the fuel cores 94 which are in the form of plates with a thickness of 0.030 inch and a length of approximately 23⅝ inches. The thickness of the nonfissionable cladding 95 of the fuel elements 84 is 0.020, and the cladding consists of an aluminum nickel alloy containing ½% nickel by volume. The space between adjacent fuel plates 92 is approximately 0.20 inch and contains coolant water as will be hereinafter described. The overall length of the core 40 is approximately 23 inches and the overall width is 24 inches. The total amount of $U^{235}$ in the core is 8.595 kilograms. Also, the walls 70 and 72, 66 and 68, lower, and upper support members 76 and 78, upper and lower boxes 60 and 62, and hemispherical plate 44 and cylinder 56 are all constructed of aluminum.

Figure 4:
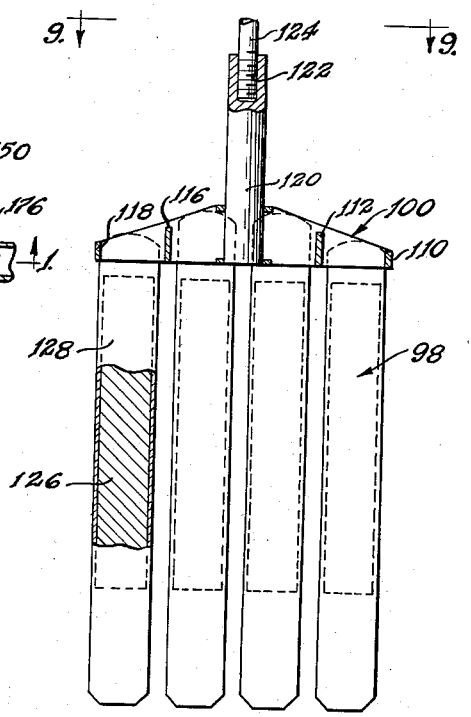
Figure 4 is a sectional view of the mechanical control mechanism for the reactor shown in Figures 1, 2, and 3.
Figure 3:
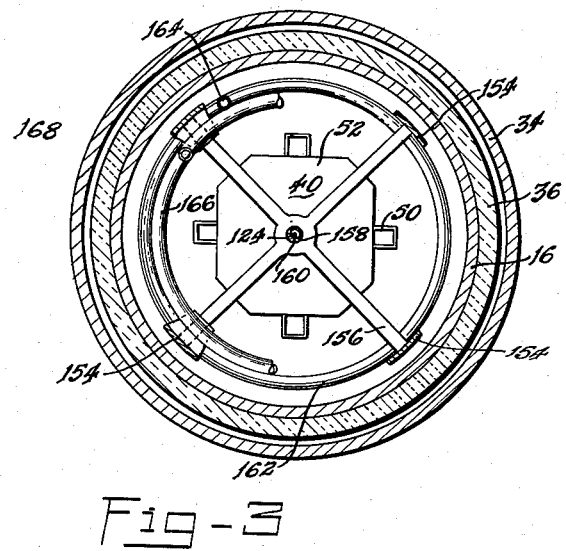
Figure 3 is a sectional view taken along the line 3—3 of Figure 1.

The double walls 70 and 72 and the spacers 74 form channels 96 for control plates 98. There are, all told, 16 channels 96 and 16 control plates 98, and the 16 control plates 98 are secured to a yoke 100 at their upper extremity as shown in Figs. 4 and 9. The yoke 100 has four parallel strips 102, 104, 106, and 108 to which the control plates 98 are secured. As indicated in Figure 9, the plates 98 are disposed in curved recesses 109 in the strips 102, 104, 106 and 108, and are secured by rivets 111 between the strips and a curved support block 113. The strips are maintained in parallel relation by cross-members 110, 112, 114, 116 and 118. The cross-member 114 has a cylindrical hollow sleeve 120 centrally which extends upwardly from the yoke 100 between the two strips 104 and 106. The upper extremity of the sleeve 120 is provided with threads 122 on its interior surface. A threaded shaft 124 extends approximately on the axis of the pressure vessel 16 and engages the threads 122 in the sleeve 120 as will be further described hereinafter.

Each of the control plates 98 contains a plate-shaped core 126 of material having a thermal neutron capture-cross section of at least 100 barns, cadmium in the particular reactor construction. The core 126 is clad by a layer 128 of aluminum containing ½% nickel. Each of the plates 98 is three feet long and four and a half inches wide and one-eighth inch thick, the cladding layer 128 being approximately 0.020 inch thick. The cadmium cores 126 of the control plates 98 are approximately two feet long, and are located nearer the top ends of the plates 98, leaving almost one foot at the lower extremity of the control plates 98 which contains no core, as indicated in Figure 4. When the control plates 98 are removed a maximum distance from the core 40 of the reactor, approximately eight inches of the control plates 98 remain in the channels 96, thus assuring alignment of the control plates with the channels. Further, the control plates 98 are provided with a curved cross section to permit the edges of one side of the control plates to abut one of the double walls and the center of the opposite side of the control plates to abut the other of the double walls. In this manner, the control plates will be prevented from vibrating as the result of the flow of coolant through the channels 96.

The cover plate 24 of the pressure vessel 16 is provided with an aperture 130 on the axis of the pressure vessel, and the shaft 124 extends through the aperture 130 and is journaled in a bearing 132 disposed in the aperture 130. A gear box 134 is disposed immediately above the aperture 130 and contains a first beveled gear 136 which is secured to the end of the shaft 124. A second shaft 138 extends into the gear box 136 and is journaled therein, and a second beveled gear 140 is secured to the end of the shaft 138 and meshed with the bevel gear 136. A sleeve 142 is disposed coaxially about the shaft 138 and sealed to the gear box 134 and the end of the sleeve 142 is provided with packing 144 to prevent escape of fluids. Also, the bearing 132 effectively seals the aperture 130 to prevent steam from entering into the gear box 134. The surface of the cover plate 24 confronting the core 40 of the reactor is also provided with a stainless steel liner 146 to prevent corrosion. A cap 148 extends over the cover plate and gear box, this cap being removed in Figure 2.

The cover plate 24 is provided with a depending cylindrical portion 150 which is disposed coaxially within the pressure vessel 16 and provided with a gasket 152 adjacent to its lower extremity which abuts the inner wall of the pressure vessel 16. This annular gasket 152 forms a seal between the depending portion 150 of the cover plate 24 and the pressure vessel 16, and still permits the upward removal of the cover plate 24. Four beams 154 are secured to the depending portion 150 of the cover and extend downwardly into the pressure vessel 16 parallel with the axis thereof. These four beams 154 support an X-shaped bearing mounting 156 approximately midway between the core 40 of the reactor and the cover plate 24. The bearing mounting 156 has an aperture 158 disposed on the axis of the pressure vessel 16, and the shaft 124 extends through the aperture 158 and is journaled within a bearing 160 within the aperture. A first water distribution ring 162 is disposed below the bearing mounting 156 and adjacent to the top of the reactor core 40. The distribution ring 162 has perforations 163 confronting the pressure vessel 16 so that the feedwater flows downwardly between the pressure vessel 16 and the shroud 56. The ring 162 is coaxially mounted within the pressure vessel 16 adjacent to the walls thereof. A pipe 164 extends upwardly from the distribution ring 162 into the cover plate 24 where it has a right angle turn and extends out of the pressure vessel through the cover plate 24. A mass of water 165 is disposed in the pressure vessel and extends above the distribution ring 162.

A second water distribution ring 166 is disposed above the bearing mounting 156. This distribution ring 166 is also perforated and coaxially mounted in the pressure vessel 16. A second pipe 168 is connected to the distribution ring 166 and extends upwardly into the cover plate 24 of the pressure vessel 16. In the cover plate 24, it is also provided with a right angle bend, and the pipe 168 extends from the pressure vessel through the cover plate 24.

An annular manifold 170 is disposed between the cover plate 24 and its depending portion 150. This manifold 170 is connected to an aperture 172 in the depending portion 150 of the cover plate 24 located adjacent to its lower extremity and confronting an opening 174 in the pressure vessel 16. A pipe 176 is sealed within the opening 174 of the pressure vessel 16 and conducts steam from the pressure vessel.

Figure 2:
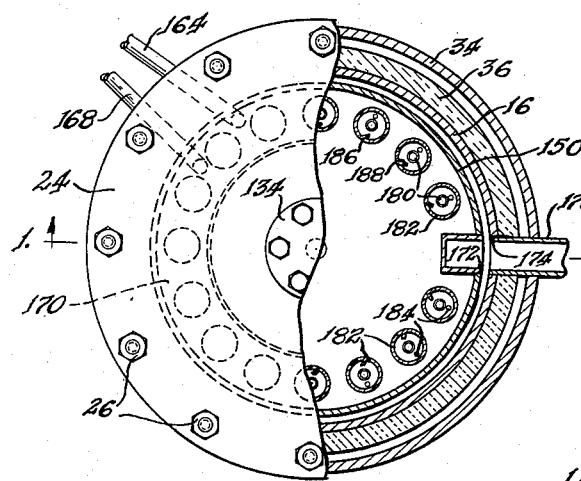
Figure 2 is a plan view of the reactor with the cap removed partly cut away and in section.

The manifold 170 is provided with a plurality of orifices 178 confronting the core 40. The orifices 178 are spaced about the periphery of the manifold 170 and short tubes 180 open at both ends extend downwardly from the orifices 178 toward the core 40 of the reactor. A cylindrical cup 182 is sealed to the manifold 170 about each tube 180 and is provided with an opening 184 in its closed end and a slot 186 adjacent to the manifold and confronting the tube 180. As indicated in Figure 2 the slots 186 are formed with an inwardly extending flap 188. This structure is known as a "cyclone steam separator" and functions by swirling steam entering through the slots 186 about the periphery of the cups 182 to remove water, the steam exiting through the tube 180 to the manifold 170, and the water passing through the openings 184 in the closed ends of the cups 182.

Figure 7:
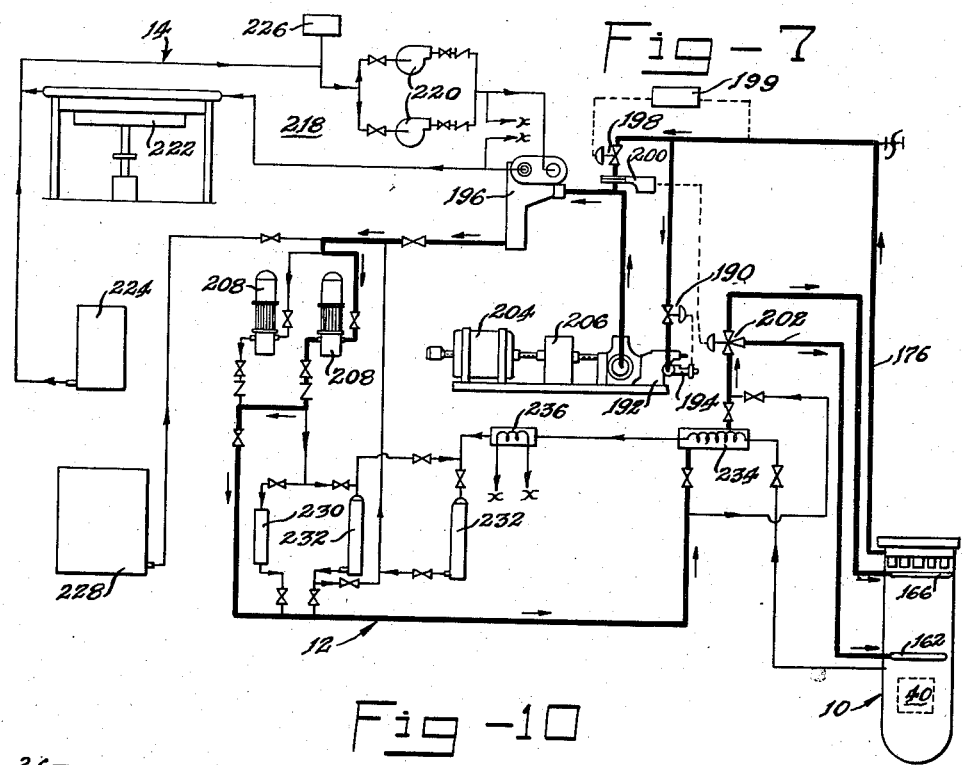
Figure 7 is a flow diagram illustrating the reactor coolant and steam circuits.

The steam and feedwater circuit 12 is illustrated in Figure 7. Steam exits from the reactor through the pipe 176 and flows through a turbine throttle valve 190 to a turbine 192. The turbine throttle valve 190 is mechanically coupled to a speed governor 194 located on the turbine 192 to prevent the turbine from exceeding the permissible operating speed or falling substantially below that speed. The steam exhausted from the turbine is conducted to a condenser 196. The pipe 176 which conducts steam from the reactor is also connected directly to the condenser 196 through a steam by-pass control valve 198. The by-pass control valve 198 is mechanically coupled to the steam pressure in the pipe 176 by regulating means 199. Steam is permitted to flow directly from the pipe 176 to the condenser 196 when the pressure in the pipe 176 exceeds 300 p. s. i. a. An orifice flow control 200 is disposed between the valve 198 and the condenser 196 and actuates a valve 202 in the feedwater circuit which will be described hereinafter. The turbine 192 is connected to a generator 204 through a gear box 206. The turbine 192 operates at a speed of 5000 R. P. M. while the generator 204 operates at a speed of 1200 R. P. M.

The condensate from the condenser 196 is returned to the reactor by feedwater pumps 208 connected in parallel, only one of the two feedwater pumps being used at a given time. The feedwater pumps 208 are connected to the three-way regulating valve 202, and in accordance with the position of the regulating valve 202, the water is returned to either the water distribution ring 166 or the ring 162. The orifice flow control 200 positions the valve 202 to permit all of the feedwater to flow to the lower distribution ring 162 for all cases in which the flow of steam through the steam by-pass control valve 198 is less than a threshold value, here 100 pounds per hour.

If the flow of steam through the control valve 198 exceeds 100 pounds per hour, the flow control 200 actuates the feedwater control valve 202 to direct a portion of the feedwater to the upper distribution ring 166.

The feedwater entering through the upper distribution ring 166 may be termed "saturated" due to the fact that the steam in the reactor pressure vessel 16 heats this feedwater as it is sprayed from the distribution ring 166 and enters the body of moderator water surrounding the reactor core 40. On the other hand, the feedwater entering through the distribution ring 162, may be termed "sub-cooled," since it enters the reactor at essentially the same conditions as the condensate in the well of the condenser 196 and is below saturation temperature. The reactor power will increase as the degree of sub-cooling increases, and hence the larger proportion of the feedwater entering through the ring 162, and thus being sub-cooled, the higher will be the power level of the reactor.

It is clear, that an increase in power demand from the generator 204 will tend to slow the turbine 192, and that the governor 194 of the turbine will thus open the valve 190 to permit more steam to enter the turbine. As a result of the increased flow of steam from the reactor to the turbine 192, the pressure in the pipe 176 will fall, thus causing the pressure-responsive valve 198 to tend to close. Restriction of the valve 198 reduces the flow of steam through the flow control 200, and the flow control 200 thus actuates the feedwater control valve 202 to increase the percentage of sub-cooled water entering the reactor through the distribution ring 162. In this manner, an increase in the steam demand is effective to increase the power of the reactor. In like manner, a decrease in the steam demand increases the percentage of saturated feedwater and reduces the reactor power.

Figure 10:
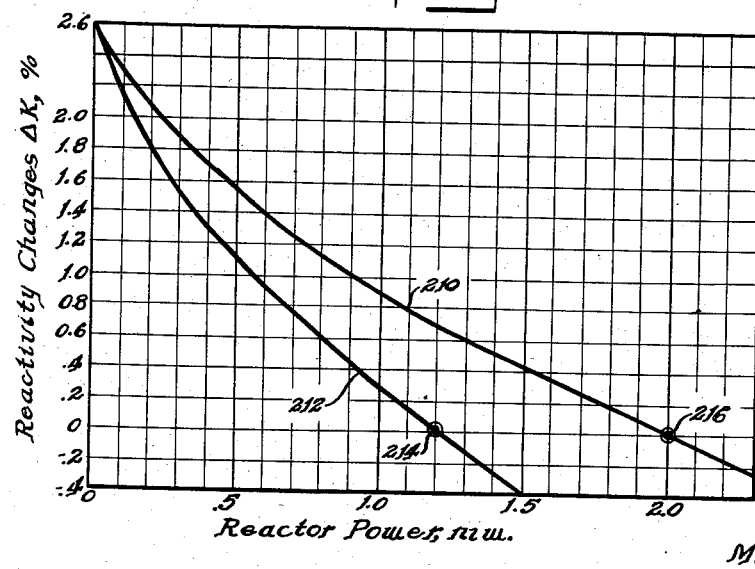
Figure 10 is a graph illustrating the relation between reactor power and reactivity.

Figure 10 illustrates the range of control which may be achieved by the control system described above. The curve 210 in Figure 10 represents the power level of the reactor with 100% sub-cooled feedwater, i. e. all feedwater enters through the ring 162, and the curve 212 represents the power level with 100% saturated feedwater. The various points along the curves 210 and 212 are achieved by proper orientation of the reactor control plates 98. If the reactor is operating at a given power level on the 100% saturated feedwater curve 212, an increase of reactivity will result in a shift in the percentage of sub-cooled feedwater to maintain the power level of the reactor constant until the reactor is operating on the 100% sub-cooled curve 210. The designed power level of the reactor with 100% saturated feedwater is 1.2 megawatts, indicated by the dot 214 and by the figure "0" on the scale of reactivity changes in Figure 10. The control system for the reactor will automatically maintain the reactivity constant when power demands increase to shift the power level of the reactor to 2 megawatts, as indicated by the dot 216 on the 100% sub-cooled water curve 210.

A cooling loop 218 is provided for the condenser 196 and includes pumps 220, and a fluid cooler 222. The cooler 222 illustrated in Figure 7 has vertical air discharge to prevent cross-wind interference, and is fan-driven. A solution of 60% ethylglycol and water is circulated through the coolant loop 218 to avoid damage by freezing, and a storage tank 224 is provided for this coolant fluid. An expansion tank 226 is also provided to prevent excess pressures developing in the coolant loop 218. A storage tank 228 is also provided for the steam and feedwater circuit 12, the tank 228 being connected to the inlet side of the feedwater pumps 208.

A filter 230 is also provided for the steam and feedwater circuit and may be connected between the output side of the feedwater pumps 208 and the feedwater control valve 202. In addition, a pair of ion exchangers 232 are connected to the pressure vessel 16 to permit bleeding a small amount of the primary coolant from the pressure vessel for purification. The coolant flows through a heat exchanger 234 which utilizes the feedwater to remove the heat from the moderator fluid, and in this manner minimize lost heat. A second heat exchanger 236 is also connected in this circuit, and utilizes some of the coolant from the coolant loop 218 which cools the condenser 196, as indicated by the connections in Figure 7. In this manner, the temperature of the water from the reactor pressure vessel is reduced to permissible limits for the ion exchangers 232.

When first setting the reactor into operation, the reactor is first filled with water and the water is filtered by the filter 230 to remove foreign objects and purify the water. The filter 230 is then disconnected from the circuit. The ion exchangers 232 are then employed to bring the water to a high degree of purity. Thereafter the reactor is brought to criticality by withdrawal of the control rod curtain or plates 98. After the reactor becomes critical, it must be operated for a sufficient period of time to establish equilibrium xenon and samarium concentrations in the reactor fuel. The control plates 98 are then positioned for the specified reactor power level with the feedwater returned to the reactor being 100% subcooled, this condition being the maximum design power level for the reactor. Under the conditions set forth in Figure 10, the reactor power level would be adjusted to 2 megawatts with 100% sub-cooled feedwater, indicated by the dot 216. The reactor is then in condition for unmanned operation and will continue to operate for a period of time limited principally by fuel depletion, in the particular construction, one year. This period of unmanned operating time may be greatly increased by the use of burnable poison and may extend to periods up to 3 years.

The reactor performance is summarized below in the following tables:

A. REACTOR

1. Performance

| | |
|---|---|
| Power level, nw | 1.5 |
| Av. power density (referring to water volume), kw/liter | 14 |
| Steam pressure, p. s. i. a | 300 |
| Steam temperature, °F | 417 |
| Steam production (normal), lb./hr | 5,030 |
| Water recirculation rate, lb./hr | 90–120 |
| Av. density reduction due to boiling, percent | 8–12 |

2. Core

| | |
|---|---|
| Over-all length, in | 23 |
| Over-all width, in | 24 |
| Active height, in | 23⅜ |
| Fuel elements: | |
| Geometry, in | 3 x 3¼ |
| Number of elements | 45 |
| Number of fuel plates per element | 12 |
| Total thickness of plates, in. (0.030-in. "meat," 0.020-Al—Ni clad) | 0.070 |
| Water channel gap, in | 0.20 |
| Heat transfer area, sq. ft | 470 |
| Fuel per element, gm. $U^{235}$ | 191 |
| Av. heat flux, B. t. u./(hr.) (sq. ft.) | 11,000 |
| Av. thermal neutron flux in fuel plates, n./(cm.²) (sec) | $\sim 7 \times 10^{12}$ |
| Cold metal-to-water volume ratio (total core) | 0.55 |
| Total $U^{235}$ fuel content, kg | 8.6 |
| $K_{eff}$, cold, virgin reactor (no xenon or samarium) | ~1.10 |
| $K_{eff}$, operating virgin reactor (no steam voids; equilibrium xenon and samarium) | ~1.03 |

3. Pressure vessel

| | |
|---|---|
| Material | Type 304 stainless steel. |
| Tank I. D., ft | 4.0. |
| Over-all height, ft | 11½. |
| Wall thickness, in | ¾. |
| Insulation (magnesia or Fiberglas), thickness, in | 3. |

B. TURBINE GENERATOR

| | |
|---|---|
| Steam flow, lb./hr | 4,930 |
| Plant electrical operating factor, percent | 75 |
| Generator output (power factor=0.8), kw | 150 |
| Auxiliary electrical power, kw | 33 |
| Throttle pressure, p. s. i. a | 295 |
| Exhaust pressure, p. s. i. a | 14.7 |

C. CONDENSER

| | |
|---|---|
| Type | Shell and tube. |
| Tube material | 6063–T831 aluminum alloy. |
| Shell material | ASTM–A285 stainless. |
| Tube size | ¾ in. I. D. x 10 ft. long. |
| Surface area, sq. ft | 350. |
| Heat capacity, mw | 2.0. |
| Operating pressure, p. s. i. a | 14.7. |
| Design pressure, p. s. i. a | 50.0. |
| Oxygen removal, cc./liter | 0.01. |
| Coolant, wt.-percent | 60% ethylene glycol, 40% water. |
| Flow, G. P. M | 245. |
| Inlet Temperature, °F | 140. |
| Outlet temperature, °F | 180. |
| Flash point, °F | 240. |
| Fire point, °F | 245. |
| Freezing point, °F | −58. |
| Sp. heat at 158° F., B. t. u./(lb.) (°F.) | 0.824. |

D. PUMPS

1. Condenser feedwater pump

| | |
|---|---|
| Standby capacity, percent | 100 |
| Stages | 6 |
| Flow, G. P. M | 20 |
| Total head, ft | 950 |
| Up and down thrust, lb | 660 |
| Net positive suction head, ft | 4 |
| Pump speed, R. P. M | 3,500 |
| Efficiency, percent | 31 |
| Pump brake horsepower (per pump) | 14.5 |
| Driver, H. P | 15 |
| Driver elec. requirements: 220–440, 3-phase 60-cycle. | |

2. Coolant circulating pump

| | |
|---|---|
| Standby capacity, percent | 100 |
| Flow, G. P. M | 300 |
| Total head, ft | 40 |
| Pump brake horsepower (per pump) | 7.5 |
| Driver power, H. P | 10.0 |
| Net positive suction head, ft | 10 |
| Pump speed, R. P. M | 1,750 |
| Motor power requirements: 440, 3-phase, 60-cycle. | |

E. DRY-TYPE FLUID COOLER

| | |
|---|---|
| Design ambient air temperature, °F | 90. |
| Elevation above sea level | 0. |
| Heat load, B. t. u./hr | 5,000,000. |
| Coolant (by weight) | 60% ethylene glycol, 40% water. |
| Flow required, G. P. M | 245. |
| Temperature to cooler, °F | 180. |
| Temperature from cooler, °F | 140. |
| Pressure drop through cooler, p. s. i | 1.0. |
| Fans per cooler | 2. |

Fans:
Std. air delivered per fan, C. F. M _____ 63,750.
Required power per fan, H. P___ 8.5.
Type of fan _____ Adjustable pitch.
Motor furnished, H. P _____ 10.0.
Blade diameter, in _____ 108.

Controls:
Automatic shutter controls.
Adjustable pitch fan blades.

After the reactor has operated for its useful life, it is desirable to remove the entire core 40 of the reactor and replace it with a new core. No provision has been made for replacing individual fuel elements, and the core 40 must be broken up completely for spent fuel processing. To replace the core, the cap 148, cover plate 24, control rod drive shaft 124, beams 154, and the upper and lower distribution rings 166 and 162 are all removed from the pressure vessel, the shaft 124 being unscrewed from the hollow tube 120.

A cup-shaped coffin 240 is then lowered into the pressure vessel 16 by a crane, partly illustrated at 242 in Figures 11 and 15. The cup-shaped coffin 240 slides into the shroud 56 and seats against the shield 46. A coffin pick-up head 244 is then positioned directly over the coffin 240. The pick-up head 244 has a circular central aperture 246 which is disposed coaxially about the axis of the pressure vessel 16 and is provided with gear teeth. The pick-up head 244 is also provided with a plurality of spaced hooks 250 which slide between the hooks 58 on the interior surface of the shroud 56. A pinion shaft 252 is then inserted into an indentation 254 in the coffin 240 to mesh a pinion gear 256 with the teeth in the aperture 246 of the pick-up head 244. Rotation of the pinion shaft 252 thus causes the hooks 250 of the pick-up head to confront the hooks 58 of the shroud 56. A pair of bolts 258 are threaded through the pick-up head and abut the coffin 240. A long-handled socket wrench 260 is used to tighten the bolts 258 against the coffin 240 and firmly lock the hooks 250 and 58 together, thus securing the coffin 240 to the shroud 56. The crane 242 may thus lift the coffin 240 with the reactor core disposed therein from the pressure vessel 17. A new core may be inserted into the pressure vessel 17 by a crane in the same manner, and the reactor will again be in condition for operation with the essential properties of a new reactor.

The foregoing description has been directed specifically to a particular construction of a reactor embodying the present invention and operation of that reactor. It is therefore intended that the scope of the present invention be not limited by the foregoing disclosure, but rather only by the appended claims.

What is claimed is:

1. A neutronic reactor system comprising a pressure vessel, a steam load connected to the pressure vessel, a mass of steam-forming liquid disposed within the pressure vessel, a core containing material fissionable by neutrons of thermal energy submerged in the steam-forming liquid and having a plurality of vertical channels, a first perforated distribution ring of greater diameter than the core horizontally disposed between the top of the core and the surface of the liquid mass, a second perforated distribution ring disposed horizontally within the pressure vessel substantially above the surface of the liquid mass, a source of steam-forming liquid, and means connected between the source of steam-forming liquid and the two distribution rings, said means regulating the proportion of steam-forming liquid flowing from the source to each of the two distribution rings responsive to the steam demand of the load, the proportion of steam-forming liquid flowing to the submerged distribution ring being proportional to the steam demand of the load.

2. A neutronic reactor system comprising a pressure vessel, a steam-demanding load connected to the pressure vessel, a mass of steam-forming liquid disposed within the pressure vessel, a core containing material fissionable by neutrons of thermal energy submerged in the steam-forming liquid and having a plurality of vertical channels, a perforated distribution ring of greater diameter than the core horizontally disposed between the top of the core and the surface of the liquid mass, means to introduce steam-forming liquid into the distribution ring, a second distribution ring mounted in the pressure vessel substantially above the surface of the liquid connected to the means for introducing steam-forming liquid, and means responsive to the demand of the load for dividing the flow of steam-forming liquid between two distribution rings, the greater the steam demand of the load the more liquid flowing to the submerged first distribution ring.

3. A neutronic reactor comprising a pressure vessel, a steam load connected to the pressure vessel, a mass of steam-forming liquid disposed within the pressure vessel, a core containing material fissionable by neutrons of thermal energy submerged in the steam-forming liquid and having a plurality of vertical channels, a first perforated distribution ring of greater diameter than the core horizontally disposed between the top of the core and the surface of the liquid mass, a second perforated distribution ring disposed horizontally within the pressure vessel substantially above the surface of the liquid mass, a source of steam-forming liquid of lower temperature than the saturation temperature of the liquid, and a two-position valve having an inlet connected to the source of steam-forming liquid and an outlet connected to each of the two distribution rings, whereby positioning the valve to permit a larger percentage of the steam-forming liquid from the source to enter the submerged distribution ring increases the power production of the reactor.

4. A neutronic reactor system comprising the elements of claim 2 wherein the means for introducing the steam-forming liquid comprises a two-position regulating valve having an inlet and two outlets, each of the outlets being connected to one of the distribution rings, a source of steam-forming liquid connected to the inlet, means connected to the pressure vessel to release steam when the pressure thereof exceeds a threshold value, and means coupled to the two-position regulating valve and to the steam release means for actuating the regulating valve, said means positioning the valve to proportion the amount of liquid flow to the second distribution ring with the amount of released steam.

5. A neutronic reactor comprising a pressure vessel, a mass of steam-forming liquid disposed within the pressure vessel, a core containing material fissionable by neutrons of thermal energy submerged in the steam-forming liquid having a plurality of vertical channels, a first perforated distribution ring of greater diameter than the core horizontally disposed between the top of the core and the surface of the liquid mass, the second perforated distribution ring disposed horizontally within the pressure vessel substantially above the surface of the liquid mass, a turbine connected to the pressure vessel, a condenser connected to the turbine, a feed-liquid pump connected to the condenser, a three-way regulating valve connected between the feed-liquid pump and the two distribution rings in the reactor, a steam by-pass control valve connected between the pressure vessel and the condenser opening in response to a steam pressure in excess of a threshold value, a flow control connected between the by-pass valve and the condenser, said control being coupled to the three-way regulating valve and actuating said valve in response to the flow of steam through the by-pass control valve to divide the feed liquid between the two distribution rings, the portion of the feed liquid entering the submerged distribution ring being directly and monotonically related to the demand for steam by the turbine, a turbine throttle valve connected between the turbine and the pressure vessel, and a governor connected to the turbine and coupled to the throttle valve to actuate the throttle valve and maintaining the speed of the turbine constant.

6. A neutronic reactor system comprising a pressure vessel, a steam turbine connected to the pressure vessel, a condenser connected to the steam turbine, a feedwater pump connected to the condenser, a mass of steam-forming liquid disposed within the pressure vessel, a core containing material fissionable by neutrons of thermal energy submerged in the steam forming liquid and having a plurality of vertical channels, a first perforated distribution ring of greater diameter than the core horizontally disposed between the top of the core and the surface of the liquid mass, a second perforated distribution ring disposed horizontally within the pressure vessel substantially above the surface of the liquid mass, a two-position regulating valve having an inlet and two outlets, each of the outlets being connected to one of the two distribution rings, and the inlet being connected to the feedwater pump, steam by-pass means including a valve connected between the pressure vessel and the condenser, means for actuating the valve responsive to the pressure of the steam within the pressure vessel, means for actuating the two-position regulating valve coupled thereto and having a steam flow measuring mechanism inserted in the by-pass means, whereby the two-position regulating valve proportions the flow of steam-forming liquid to the second distribution ring with the quantity of steam flowing through the by-pass means.

7. A neutronic reactor system comprising the elements of claim 4 in combination with an over-speed governor coupled to the turbine including a valve connected between the turbine and the pressure vessel for regulating the flow of steam to the turbine to maintain the operating speed thereof.

References Cited in the file of this patent
UNITED STATES PATENTS

| | | |
|---|---|---|
| 2,642,541 | Young | June 16, 1953 |
| 2,675,487 | Schallert et al. | Apr. 13, 1954 |
| 2,708,656 | Fermi et al. | May 17, 1955 |
| 2,774,730 | Young | Dec. 18, 1956 |
| 2,781,455 | Affner | Feb. 12, 1957 |

OTHER REFERENCES

Proceedings of the International Conference on the Peaceful Uses of Atomic Energy, vol. 3, United Nations, N. Y., 1955, pp. 56–68.

CF–53–2–112, U. S. Atomic Energy Commission, by P. R. Kasten, Feb. 12, 1933, pp. 2–5.

Nucleonics, July 1955, pp. 34, 35.
Nucleonics, December 1955, pp. 42–45.
Nucleonics, April 1956, pp. 106–108.